United States Patent
Chandrashekhar et al.

(10) Patent No.: US 10,250,443 B2
(45) Date of Patent: Apr. 2, 2019

(54) USING PHYSICAL LOCATION TO MODIFY BEHAVIOR OF A DISTRIBUTED VIRTUAL NETWORK ELEMENT

(71) Applicant: Nicira, Inc., Palo Alto, CA (US)

(72) Inventors: Ganesan Chandrashekhar, Campbell, CA (US); Vivek Agarwal, Campbell, CA (US)

(73) Assignee: NICIRA, INC., Palo Alto, CA (US)

( * ) Notice: Subject to any disclaimer, the term of this patent is extended or adjusted under 35 U.S.C. 154(b) by 85 days.

(21) Appl. No.: 14/834,207

(22) Filed: Aug. 24, 2015

(65) Prior Publication Data

US 2016/0094396 A1   Mar. 31, 2016

Related U.S. Application Data

(60) Provisional application No. 62/057,963, filed on Sep. 30, 2014.

(51) Int. Cl.
*H04L 12/24* (2006.01)
*H04L 12/721* (2013.01)
(Continued)

(52) U.S. Cl.
CPC ...... *H04L 41/0893* (2013.01); *G06F 9/44505* (2013.01); *G06F 9/45533* (2013.01); *H04L 41/0806* (2013.01); *H04L 41/0816* (2013.01); *H04L 45/44* (2013.01); *H04L 45/586* (2013.01); *G06F 9/454* (2018.02)

(58) Field of Classification Search
None
See application file for complete search history.

(56) References Cited

U.S. PATENT DOCUMENTS

| 5,504,921 A | 4/1996 | Dev et al. |
| 5,550,816 A | 8/1996 | Hardwick et al. |

(Continued)

FOREIGN PATENT DOCUMENTS

| CN | 102571998 A | 7/2012 |
| EP | 1653688 A1 | 5/2006 |

(Continued)

OTHER PUBLICATIONS

International Search Report and Written Opinion for PCT/US2015/050786, dated Nov. 26, 2015, Nicira, Inc.

(Continued)

*Primary Examiner* — Mohammad S Adhami
(74) *Attorney, Agent, or Firm* — Adeli LLP

(57) ABSTRACT

A system for network virtualization in which physical network resources in different physical contexts are configured to implement one or more distributed logical network elements, at least some of the physical network resources implementing the distributed logical network elements configured according the physical context of those network resources. The local configuration of a physical locale is a version of the logical configuration that is modified specifically for the physical locale. Such modification is based on locale identifiers that are assigned to the physical locales. Some systems use locale-specific information to modify next-hop preference. Some system use locally modified configurations to determine the placement of VMs.

22 Claims, 10 Drawing Sheets

(51) Int. Cl.
*H04L 12/713* (2013.01)
*G06F 9/445* (2018.01)
*G06F 9/455* (2018.01)
*G06F 9/451* (2018.01)

(56) References Cited

U.S. PATENT DOCUMENTS

| | | |
|---|---|---|
| 5,751,967 A | 5/1998 | Raab et al. |
| 6,006,275 A | 12/1999 | Picazo, Jr. et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,493,767 B1 | 12/2002 | Ishida et al. |
| 6,512,745 B1 | 1/2003 | Abe et al. |
| 6,539,432 B1 | 3/2003 | Taguchi et al. |
| 6,631,137 B1 | 10/2003 | Lorrain et al. |
| 6,640,251 B1 | 10/2003 | Wiget et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,215,637 B1 | 5/2007 | Ferguson et al. |
| 7,260,648 B2 | 8/2007 | Tingley et al. |
| 7,283,473 B2 | 10/2007 | Arndt et al. |
| 7,339,929 B2 | 3/2008 | Zelig et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,760,735 B1 | 7/2010 | Chen et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,190,767 B1 | 5/2012 | Maufer et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,265,075 B2 | 9/2012 | Pandey |
| 8,281,067 B2 | 10/2012 | Stolowitz |
| 8,312,129 B1 | 11/2012 | Miller et al. |
| 8,320,388 B2 | 11/2012 | Louati et al. |
| 8,339,959 B1 | 12/2012 | Moisand et al. |
| 8,339,994 B2 | 12/2012 | Gnanasekaran et al. |
| 8,351,418 B2 | 1/2013 | Zhao et al. |
| 8,370,834 B2 | 2/2013 | Edwards et al. |
| 8,401,024 B2 | 3/2013 | Christensen et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,611,351 B2 | 12/2013 | Gooch et al. |
| 8,611,352 B2 | 12/2013 | Mizrahi et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,837,281 B2 | 9/2014 | Sultan et al. |
| 8,848,508 B2 | 9/2014 | Moreno et al. |
| 8,856,518 B2 | 10/2014 | Sridharan et al. |
| 8,923,155 B2 | 12/2014 | Qu et al. |
| 8,958,298 B2 | 2/2015 | Zhang et al. |
| 8,989,183 B2 | 3/2015 | Bansal et al. |
| 9,008,097 B2 | 4/2015 | Bloach et al. |
| 9,059,999 B2 | 6/2015 | Koponen et al. |
| 9,137,052 B2 | 9/2015 | Koponen et al. |
| 9,225,636 B2 | 12/2015 | Krishnan et al. |
| 9,246,821 B1 | 1/2016 | Li et al. |
| 9,306,837 B1 | 4/2016 | Jain et al. |
| 9,407,450 B2 | 8/2016 | Singh |
| 9,413,644 B2 | 8/2016 | Agarwal et al. |
| 9,448,821 B2 | 9/2016 | Wang |
| 9,575,782 B2 | 2/2017 | Chandrashekhar et al. |
| 9,768,980 B2 | 9/2017 | Subramaniyam et al. |
| 9,785,455 B2 | 10/2017 | Chandrashekhar et al. |
| 9,893,988 B2 | 2/2018 | Agarwal et al. |
| 9,910,686 B2 | 3/2018 | Chandrashekhar et al. |
| 9,977,685 B2 | 5/2018 | Chandrashekhar et al. |
| 2001/0043614 A1 | 11/2001 | Viswanadham et al. |
| 2002/0013858 A1 | 1/2002 | Anderson |
| 2002/0093952 A1 | 7/2002 | Gonda |
| 2002/0194369 A1 | 12/2002 | Rawlins et al. |
| 2003/0026258 A1 | 2/2003 | Takatani et al. |
| 2003/0026271 A1 | 2/2003 | Erb et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0093481 A1 | 5/2003 | Mitchell et al. |
| 2004/0054799 A1 | 3/2004 | Meier et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0025179 A1 | 2/2005 | McLaggan et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2005/0182853 A1 | 8/2005 | Lewites et al. |
| 2006/0002370 A1 | 1/2006 | Rabie et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291388 A1 | 12/2006 | Amdahl et al. |
| 2007/0008981 A1 | 1/2007 | Pathan |
| 2007/0043860 A1 | 2/2007 | Pabari |
| 2007/0061492 A1 | 3/2007 | van Riel |
| 2007/0064673 A1 | 3/2007 | Bhandaru et al. |
| 2007/0097948 A1 | 5/2007 | Boyd et al. |
| 2007/0140128 A1 | 6/2007 | Klinker et al. |
| 2007/0156919 A1 | 7/2007 | Potti et al. |

(56) References Cited

U.S. PATENT DOCUMENTS

| | | |
|---|---|---|
| 2007/0201357 A1 | 8/2007 | Smethurst et al. |
| 2007/0201490 A1 | 8/2007 | Mahamuni |
| 2007/0286209 A1 | 12/2007 | Wang et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0008148 A1 | 1/2008 | Sagawa |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0069107 A1 | 3/2008 | Sofia et al. |
| 2008/0071900 A1 | 3/2008 | Hecker et al. |
| 2008/0072305 A1 | 3/2008 | Casado et al. |
| 2008/0086726 A1 | 4/2008 | Griffith et al. |
| 2008/0151893 A1 | 6/2008 | Nordmark et al. |
| 2008/0159301 A1 | 7/2008 | de Heer |
| 2008/0181243 A1 | 7/2008 | Vobbilisetty et al. |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2008/0298274 A1 | 12/2008 | Takashige et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0129271 A1 | 5/2009 | Ramankutty et al. |
| 2009/0150521 A1 | 6/2009 | Tripathi |
| 2009/0150527 A1 | 6/2009 | Tripathi et al. |
| 2009/0161547 A1 | 6/2009 | Riddle et al. |
| 2009/0235325 A1 | 9/2009 | Dimitrakos et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0287848 A1 | 11/2009 | Kamura et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0046531 A1 | 2/2010 | Louati et al. |
| 2010/0107162 A1 | 4/2010 | Edwards et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0208615 A1 | 8/2010 | Soon et al. |
| 2010/0214949 A1 | 8/2010 | Smith et al. |
| 2010/0257263 A1* | 10/2010 | Casado ............... H04L 49/00 709/223 |
| 2010/0275199 A1 | 10/2010 | Smith et al. |
| 2010/0287548 A1 | 11/2010 | Zhou et al. |
| 2010/0290485 A1 | 11/2010 | Martini et al. |
| 2011/0016215 A1 | 1/2011 | Wang |
| 2011/0022695 A1 | 1/2011 | Dalal et al. |
| 2011/0032830 A1 | 2/2011 | Merwe et al. |
| 2011/0035494 A1 | 2/2011 | Pandey et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0194567 A1 | 8/2011 | Shen |
| 2011/0202920 A1 | 8/2011 | Takase |
| 2011/0205931 A1 | 8/2011 | Zhou et al. |
| 2011/0225207 A1 | 9/2011 | Subramanian et al. |
| 2011/0261825 A1 | 10/2011 | Ichino |
| 2011/0264610 A1 | 10/2011 | Armstrong et al. |
| 2011/0283017 A1 | 11/2011 | Alkhatib et al. |
| 2011/0299534 A1 | 12/2011 | Koganti et al. |
| 2011/0299537 A1 | 12/2011 | Saraiya et al. |
| 2011/0310899 A1 | 12/2011 | Alkhatib et al. |
| 2011/0317703 A1 | 12/2011 | Dunbar et al. |
| 2011/0320577 A1 | 12/2011 | Bhat et al. |
| 2012/0008528 A1 | 1/2012 | Dunbar et al. |
| 2012/0014386 A1 | 1/2012 | Xiong et al. |
| 2012/0014387 A1 | 1/2012 | Dunbar et al. |
| 2012/0017022 A1 | 1/2012 | Corrigan et al. |
| 2012/0131643 A1 | 5/2012 | Cheriton |
| 2012/0158997 A1 | 6/2012 | Hsu et al. |
| 2012/0182992 A1 | 7/2012 | Cowart et al. |
| 2012/0236734 A1 | 9/2012 | Sampath et al. |
| 2012/0307826 A1 | 12/2012 | Matsuoka |
| 2012/0323987 A1 | 12/2012 | Cantu et al. |
| 2013/0007740 A1 | 1/2013 | Kikuchi et al. |
| 2013/0010600 A1 | 1/2013 | Jocha et al. |
| 2013/0016723 A1 | 1/2013 | Arad et al. |
| 2013/0031233 A1 | 1/2013 | Feng et al. |
| 2013/0034094 A1 | 2/2013 | Cardona et al. |
| 2013/0044629 A1 | 2/2013 | Biswas et al. |
| 2013/0044636 A1 | 2/2013 | Koponen et al. |
| 2013/0044641 A1 | 2/2013 | Koponen et al. |
| 2013/0054761 A1 | 2/2013 | Kempf et al. |
| 2013/0058346 A1 | 3/2013 | Sridharan et al. |
| 2013/0073743 A1 | 3/2013 | Ramasamy et al. |
| 2013/0097345 A1 | 4/2013 | Munoz et al. |
| 2013/0103817 A1 | 4/2013 | Koponen et al. |
| 2013/0124750 A1 | 5/2013 | Anumala et al. |
| 2013/0125112 A1* | 5/2013 | Mittal ............... G06F 9/45558 718/1 |
| 2013/0136126 A1 | 5/2013 | Wang et al. |
| 2013/0142048 A1 | 6/2013 | Gross, IV et al. |
| 2013/0145002 A1 | 6/2013 | Kannan et al. |
| 2013/0145008 A1 | 6/2013 | Kannan et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0151685 A1 | 6/2013 | Bursell |
| 2013/0227550 A1 | 8/2013 | Weinstein et al. |
| 2013/0227566 A1 | 8/2013 | Higuchi et al. |
| 2013/0266015 A1 | 10/2013 | Qu et al. |
| 2013/0266019 A1 | 10/2013 | Qu et al. |
| 2013/0268588 A1* | 10/2013 | Chang ............... H04L 12/6418 709/204 |
| 2013/0301553 A1 | 11/2013 | Klein |
| 2013/0318219 A1 | 11/2013 | Kancherla |
| 2013/0322453 A1 | 12/2013 | Allan |
| 2013/0329548 A1 | 12/2013 | Nakil et al. |
| 2013/0332602 A1 | 12/2013 | Nakil et al. |
| 2013/0332619 A1 | 12/2013 | Xie et al. |
| 2013/0332983 A1 | 12/2013 | Koorevaar et al. |
| 2013/0339544 A1 | 12/2013 | Mithyantha et al. |
| 2014/0006585 A1 | 1/2014 | Dunbar et al. |
| 2014/0019639 A1 | 1/2014 | Ueno |
| 2014/0025779 A1 | 1/2014 | Matsumoto |
| 2014/0036730 A1* | 2/2014 | Nellikar ............... H04L 49/70 370/255 |
| 2014/0036924 A1 | 2/2014 | Christenson |
| 2014/0050091 A1 | 2/2014 | Biswas et al. |
| 2014/0056298 A1 | 2/2014 | Vobbilisetty et al. |
| 2014/0064276 A1 | 3/2014 | Basso et al. |
| 2014/0068602 A1 | 3/2014 | Gember et al. |
| 2014/0092901 A1 | 4/2014 | Kapadia et al. |
| 2014/0092907 A1 | 4/2014 | Sridhar et al. |
| 2014/0112343 A1 | 4/2014 | Lambeth et al. |
| 2014/0115578 A1 | 4/2014 | Cooper et al. |
| 2014/0115584 A1 | 4/2014 | Mudigonda et al. |
| 2014/0123211 A1 | 5/2014 | Wanser et al. |
| 2014/0140244 A1 | 5/2014 | Kapadia et al. |
| 2014/0146817 A1 | 5/2014 | Zhang |
| 2014/0169169 A1 | 6/2014 | Almog et al. |
| 2014/0169215 A1 | 6/2014 | Rajendran et al. |
| 2014/0169222 A1 | 6/2014 | Cohen et al. |
| 2014/0195666 A1 | 7/2014 | Dumitriu et al. |

(56) References Cited

U.S. PATENT DOCUMENTS

| | | |
|---|---|---|
| 2014/0201733 A1 | 7/2014 | Benny et al. |
| 2014/0207930 A1 | 7/2014 | Benny |
| 2014/0233567 A1 | 8/2014 | Guo et al. |
| 2014/0269705 A1 | 9/2014 | Decusatis et al. |
| 2014/0269709 A1 | 9/2014 | Benny et al. |
| 2014/0280738 A1 | 9/2014 | Kölker et al. |
| 2014/0282889 A1 | 9/2014 | Ishaya et al. |
| 2014/0294005 A1 | 10/2014 | Jain et al. |
| 2014/0328343 A1 | 11/2014 | Kapadia et al. |
| 2014/0334485 A1 | 11/2014 | Jain et al. |
| 2014/0337497 A1 | 11/2014 | Wanser et al. |
| 2014/0348166 A1 | 11/2014 | Yang et al. |
| 2015/0010001 A1 | 1/2015 | Duda et al. |
| 2015/0043576 A1 | 2/2015 | Dixon et al. |
| 2015/0043581 A1 | 2/2015 | Devireddy et al. |
| 2015/0058470 A1 | 2/2015 | Duda |
| 2015/0058968 A1 | 2/2015 | Wang et al. |
| 2015/0063353 A1 | 3/2015 | Kapadia et al. |
| 2015/0100681 A1 | 4/2015 | Reese et al. |
| 2015/0103661 A1 | 4/2015 | Shen et al. |
| 2015/0103679 A1 | 4/2015 | Tessmer et al. |
| 2015/0103839 A1 | 4/2015 | Chandrashekhar et al. |
| 2015/0103842 A1 | 4/2015 | Chandrashekhar et al. |
| 2015/0103843 A1 | 4/2015 | Chandrashekhar et al. |
| 2015/0106804 A1 | 4/2015 | Chandrashekhar et al. |
| 2015/0109923 A1 | 4/2015 | Hwang |
| 2015/0117454 A1 | 4/2015 | Koponen et al. |
| 2015/0124817 A1 | 5/2015 | Merchant et al. |
| 2015/0200954 A1 | 7/2015 | Gourlay et al. |
| 2015/0281042 A1 | 10/2015 | Agarwal et al. |
| 2015/0281048 A1 | 10/2015 | Agarwal et al. |
| 2015/0319009 A1 | 11/2015 | Zhao |
| 2016/0021032 A1* | 1/2016 | Maier .................. H04L 49/70 370/401 |
| 2016/0057014 A1 | 2/2016 | Thakkar et al. |
| 2016/0094364 A1 | 3/2016 | Subramaniyam et al. |
| 2016/0094365 A1 | 3/2016 | Subramaniyam et al. |
| 2016/0094366 A1 | 3/2016 | Wang et al. |
| 2017/0005918 A1 | 1/2017 | Agarwal et al. |
| 2017/0005924 A1 | 1/2017 | Agarwal et al. |
| 2017/0005942 A1 | 1/2017 | Agarwal et al. |

FOREIGN PATENT DOCUMENTS

| | | |
|---|---|---|
| EP | 2566129 A1 | 3/2013 |
| EP | 2648370 | 10/2013 |
| EP | 3202088 A1 | 8/2017 |
| JP | 2003069609 A | 3/2003 |
| JP | 2003124976 A | 4/2003 |
| JP | 2003318949 A | 11/2003 |
| JP | 2011171874 A | 9/2011 |
| JP | 2012231382 A | 11/2012 |
| JP | 2013-175075 | 9/2013 |
| JP | 2014-230217 | 12/2014 |
| KR | 1020070050864 A | 5/2007 |
| WO | 2005094008 A1 | 10/2005 |
| WO | 2005112390 A1 | 11/2005 |
| WO | 2008095010 A1 | 8/2008 |
| WO | 2012051884 A1 | 4/2012 |
| WO | 2012093429 A1 | 7/2012 |
| WO | WO 2013/063330 | 5/2013 |
| WO | WO 2013/074827 | 5/2013 |
| WO | 2013184846 A1 | 12/2013 |
| WO | 2015054671 A2 | 4/2015 |
| WO | PCT/US2015/050786 | 9/2015 |
| WO | 2015147942 A1 | 10/2015 |
| WO | 2016053372 A1 | 4/2016 |
| WO | WO 2016/053640 | 4/2016 |
| WO | 2017003957 A1 | 1/2017 |

OTHER PUBLICATIONS

Watsen, K., "Conditional Enablement of Configuration Nodes draft-kwatsen-conditional-enablement-00," Network Configuration Working Group Internet-Draft, Feb. 18, 2013, 8 pages, IETF Trust, Juniper Networks.

Nygren, Anders, et al., "OpenFlow Switch Specification v.1.3.4 (Protocol version 0x04)," Mar. 27, 2014, 171 pages, Open Networking Foundation, Palo Alto, USA.

Aggarwal, R., et al., "Data Center Mobility based on E-VPN, BGP/MPLS IP VPN, IP Routing and NHRP," draft-raggarwa-data-center-mobility-05.txt, Jun. 10, 2013, 24 pages, Internet Engineering Task Force, IETF, Geneva, Switzerland.

Caesar, Matthew, et al., "Design and Implementation of a Routing Control Platform," NSDI '05: 2nd Symposium on Networked Systems Design & Implementation , Apr. 2005, 14 pages, Usenix Association.

Casado, Martin, et al., "Virtualizing the Network Forwarding Plane," Dec. 2010, 6 pages.

Dobrescu, Mihai, et al., "RouteBricks: Exploiting Parallelism To Scale Software Routers," SOSP'09, Proceedings of the ACM SIGOPS 22nd Symposium on Operating Systems Principles, Oct. 2009, 17 pages, ACM, New York, NY.

Dumitriu, Dan Mihai, et al. (U.S. Appl. No. 61/514,990), filed Aug. 4, 2011.

Elmeleegy, Khaled, et al., "EtherProxy: Scaling Ethernet By Suppressing Broadcast Traffic," IEEE Infocom 2009, Apr. 19, 2009, 9 pages, IEEE.

Himansu, Shah, "ARP Broadcast Reduction for Large Data Centers," draft-shah-armd-arp-reduction-02.txt, Oct. 28, 2011, 11 pages, IETF Trust.

Kamath, Daya, et. al., "Edge Virtual Bridge Proposal," Version 0. Rev. 0.1, Apr. 23, 2010, 72 pages, IEEE.

Koponen, Teemu, et al., "Network Virtualization in Multi-tenant Datacenters," Technical Report TR-2013-001E, Aug. 2013, 22 pages, VMware, Inc., Palo Alto, CA, USA.

Narten, Thomas, et al., "Address Resolution Problems in Large Data Center Networks," Jan. 2013, 17 pages, Internet Engineering Task Force (IETF).

Rosen, E., "Applicability Statement for BGP/MPLS IP Virtual Private Networks (VPNs)," RFC 4365, Feb. 2006, 32 pages, The Internet Society.

Shenker, Scott, et al., "The Future of Networking, and the Past of Protocols," Dec. 2, 2011, 30 pages, USA.

\* cited by examiner

USING PHYSICAL LOCATION TO MODIFY BEHAVIOR OF A DISTRIBUTED VIRTUAL NETWORK ELEMENT

CLAIM OF BENEFIT TO PRIOR APPLICATIONS

The present application claims the benefit of U.S. Provisional Patent Application 61/057,963, filed Sep. 30, 2014. U.S. Provisional Patent Applications 62/057,963 is incorporated herein by reference.

BACKGROUND

The benefits of network virtualization are well known. VMware® NSX® is a product suite that allows for virtualizing the network for VMs. NSX provides the network elements as fundamental building blocks of a distributed virtual network, elements such as Distributed Logical Switches (for providing L2 based packet forwarding) and Distributed Logical Routers (for providing L3 based packet forwarding).

The notion of a distributed logical network element (e.g., a distributed logical Switch or Router) is powerful since it allows the operator a construct a virtual network while hiding the underlying physical network connectivity and its limitations. The only thing required from the underlying physical infrastructure is that it is capable of forwarding Ethernet encapsulated IP frames.

The distributed logical network element is instantiated on a number of physical nodes (e.g. hypervisors) that participate in the logical network. These nodes also provide uniform packet forwarding capabilities in software. The control plane is responsible in configuring these uniform policies on the participating hypervisor nodes. These policies and configurations are necessarily at the logical level. In other words, they are not concerned with the underlying physical topology. This approach works well where the underlying physical network provides "uniform connectivity" to all participating hypervisors. By "uniform connectivity", all the hypervisors are connected to a network with similar properties like latency, throughput, etc.

SUMMARY

Some embodiments of the invention provide a system for network virtualization in which physical network resources in different physical contexts are configured to implement one or more distributed logical network elements, at least some of the physical network resources implementing the distributed logical network elements being configured according the physical context of those network resources. In some embodiments, some of the distributed logical network elements are logical forwarding elements such as distributed logical switches and/or distributed logical routers. In some embodiments, the distributed logical network elements are implemented by virtualization software or hypervisors running on host machines that are situated in different physical locales (e.g., sites or data centers).

In some embodiment, a local configuration of a physical locale is a version of the logical configuration that is modified specifically for the physical locale. In some embodiments, such modification is based on locale identifiers that are assigned to the physical locales. In some embodiments, the local configuration is locally provided by the physical locale itself. In some embodiments, the local configuration is provided by a centralized network controller or manager, which delivers local configurations to each of the physical locales. In some embodiments, local configurations are embedded in the logical configuration of the entire network, and it is up to a physical locale to identify portions of the logical configuration as being applicable to that physical locale. The networking and computing resources of the locale (e.g., virtualization software in host machines) in turn uses the assigned locale identifier to identify applicable local configuration embedded in the logical configuration.

Different embodiments use locale-specific information differently to modify the behavior of distributed logical network elements. Some embodiments use locale-specific information to modify next-hop preference. Some embodiments perform ECMP to select the next hop from VMs, MPSEs, and/or MPREs based on locale-specific information. In some embodiments, locally modified configurations are used to determine the placement of VMs. In some embodiments, a VM placement engine uses locale specific information to decide the placement of VMs, i.e., to select a suitable host machine in a suitable physical locale hosting the VM based on the locale-specific information of all the physical locales.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Network virtualization is powerful because it frees the operator of the network from having to actively manage the underlying physical network connectivity and limitations. However, in many instances, being aware of its own physical context allows a hypervisor to optimize its own performance and throughput based on its physical context, even while participating in a logical network element for network virtualization. Such physical context includes the hardware of the host machine that implements hypervisor, and of the local networking environment within which the host machine is situated. For a host machine that is situated in a data center, the infrastructure of the site also constitutes the physical context of the hypervisor.

Figure 1:
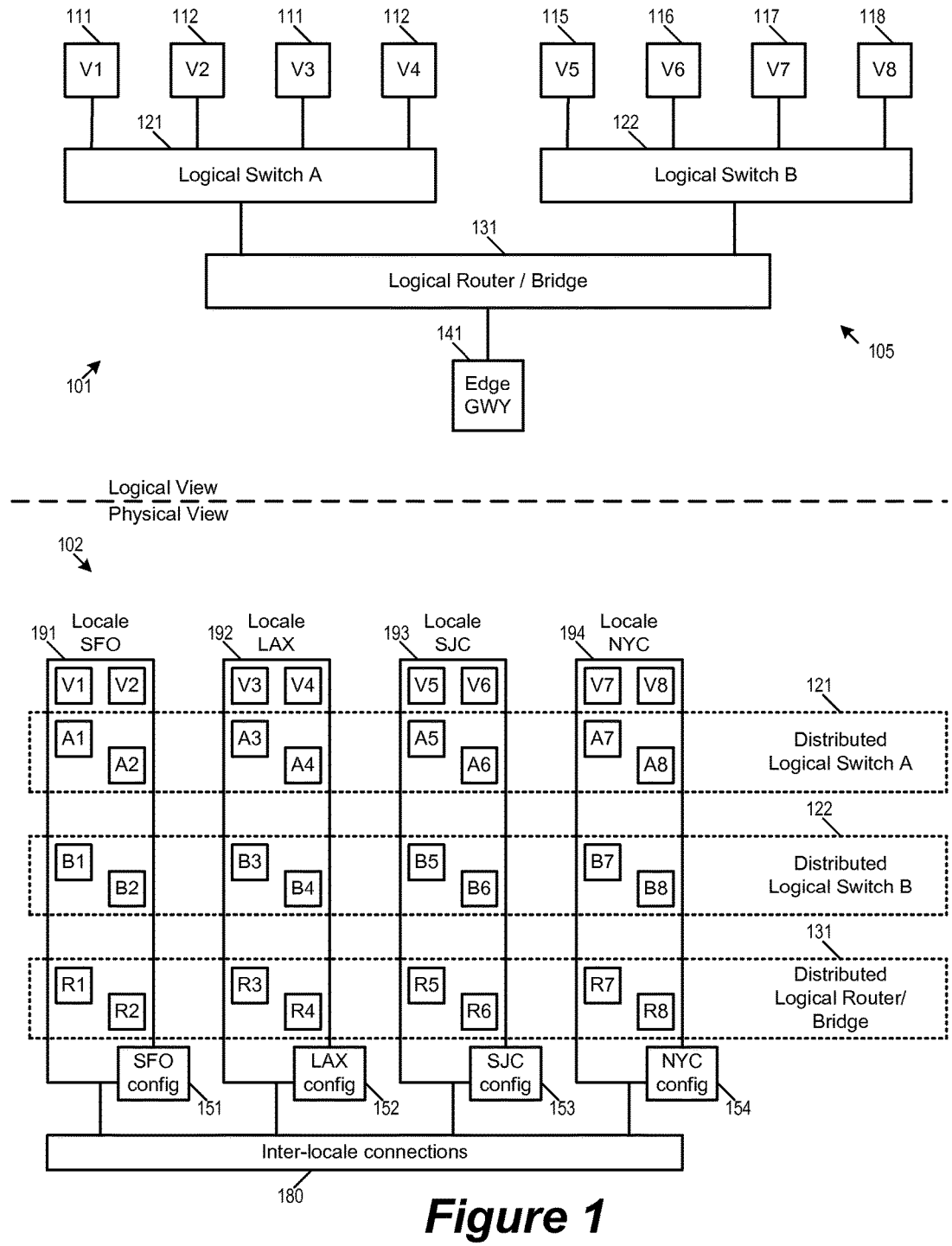
FIG. 1 illustrates a network in which distributed logical network elements are implemented over physical elements that are each configured according the physical contexts of those physical elements.

Some embodiments of the invention provide a system for network virtualization in which physical network resources in different physical contexts are configured to implement one or more distributed logical network elements, at least some of the physical network resources implementing the distributed logical network elements being configured according the physical context of those network resources. In some embodiments, some of the distributed logical network elements are logical forwarding elements such as distributed logical switches and/or distributed logical routers. In some embodiments, the distributed logical network elements are implemented by virtualization software or hypervisors running on host machines that are situated in different physical locales (e.g., sites or data centers). FIG. 1 illustrates a network 100 in which distributed logical network elements are implemented over physical elements that are each configured according the physical contexts of those physical elements.

FIG. 1 includes a logical view 101 and a physical view 102 of the network 100. The logical view of the network 100 is a logical abstraction of the system that hides or encapsulates underlying physical realities of the network. Managing the network 100 through its logical abstraction frees the operator of the network from having to manage the actual physical peculiarities of the network. In some embodiments, the logical view 101 reflects a view of the network 100 as defined according to a logical configuration 105. The underlying physical infrastructure is in turn configured according to the logical configuration in order to implement the network 100.

As illustrated, the logical view 101 (or the logical configuration) of the network includes virtual machines (VM) 111-118, a logical switch (L2 forwarding elements) 121 for a network segment A, a logical switch 122 for network segment B, a logical router/bridge (L3 forwarding element) 131, and an edge gateway 141. The VMs 111-114 belong to the network segment A and are interconnected by the logical switch 121. The VMs 115-118 belong to the network segment B and are interconnected by the logical switch 122. The network segments A and B (121 and 122) are interconnected by the logical router/bridge 131, which is in turn connected to the Internet through the edge gateway 141. In some embodiments, a network segment can be an IP subnet (such as VLAN) or an encapsulation overlay network such as VXLAN. In some embodiments, each L2 network segment is identified by or referred to by a network segment identifier such as VNI (VXLAN network identifier). The logical router/bridge 131 forwards packet between different network segments 121 and 122. In some embodiments, the logical router/bridge 131 forward packets by L3 routing (e.g., using destination L3 IP address to look up destination VNI and destination L2 MAC address) and/or by bridging (using destination L2 MAC address to lookup destination VNI).

In some embodiments, the logical configuration is specified irrespective of the underlying physical realities. In other words, the logical configuration is produced as if the connectivity of the underlying physical infrastructure is uniform and there is no distinction between resources in one locale versus resources in another locale. However, in some embodiments, the logical configuration is implemented over network resources that are situated in different physical locations such that each distributed logical network element (such as 121, 122, and 131) can span across multiple physical locations.

The physical view 102 illustrates the underlying physical infrastructure that implements the logical configuration of the network 100. As illustrated, the network 100 is implemented over four physical locales 191-194 ("SFO", "LAX", "SJC", and "NYC"). The four physical locales 191-194 are interconnected by inter-locale connections 180, which is provided by the Internet in some embodiments. Each of these locales provides a set of computing resources for implementing virtual machine as sell as networking resources for implementing logical switches and routers/bridges.

The logical switches 121 and 122, as well as the logical router/bridge 131 of the logical configuration 105 span the four physical locales. Each of these logical forwarding elements (121, 122, and 131) are implemented in a distributed fashion by the physical forwarding elements in those four locales 191-194. Specifically, the logical switch 121 is implemented by physical forwarding elements A1-A2 of locale 191, A3-A4 of locale 192, A5-A6 of locale 193, and A7-A8 of locale 194. The logical switch 122 is implemented by physical forwarding elements B1-B2 of locale 191, B3-B4 of locale 192, B5-B6 of locale 193, and B7-B8 of locale 194. The logical router/bridge 131 is implemented by physical forwarding elements R1-R2 of locale 191, R3-R4 of locale 192, R5-R6 of locale 193, and R7-R8 of locale 194. In other words, the forwarding elements are implemented on networking and/or computing resources that span the four physical locales 191-194.

The VMs 111-118 (V1-V8) are likewise implemented on computing resources that span the four physical locales. Specifically, the VMs 111-112 are implemented by computing resources in "SFO", the VMs 113-114 are implemented by computing resources in "LAX", the VMs 115-116 are implemented by computing resources in the locale "SJC" (193), and the VMs 117-118 are implemented by computing resources in the locale "NYC" (194).

In some embodiments, each physical locale is a data center that includes its own collection of interconnected network resources. Each physical location has its own set of properties, capabilities and limitations. Such local properties can include the number and types of networking and computing resources available, the bandwidth of interconnections connecting the networking resources, the latencies for sending data packets between the networking and computing resources, etc. The different physical locales can also be geographically separated as to impose significant latency for data to travel from one physical locale to another. The communication mediums that links the different physical locations are likely of limited speed and throughput (e.g., the Internet) when compared with what is available within a data center or within a computing device.

Each physical locale is associated with a set of local configurations that is based on the properties, capabilities, and limitations of the physical locale. When applied, the local configuration of a physical locale modifies the behavior of networking and computing resources of the physical locale away from the uniformity specified by the logical configuration in some embodiments. In some embodiments, the local configuration of a physical locale is based on locale specific properties of the physical locale. This is unlike a logical configuration in some embodiments, which hides the local peculiarities of the different locales from user and treats the entire network as a uniform pool of resources and connections. In some embodiments, the local configuration of a locale distinguishes physical components in the locale from physical components from other locales. In some embodiments, the local configuration prefers or forbids using certain network resources under certain conditions. In some embodiments, the local configuration reserves network resources for traffic from certain nodes. In some embodiments, the local configuration is based on performance metrics (such as latency, available memory, available bandwidth, etc.) of physical components in the network. In some embodiments, the local configuration is made to optimize resource usage in the physical locale in order to balance load, avoid congested routing resources, guarantee bandwidth, or perform equal cost multi-path routing (ECMP).

As illustrated, the local configurations of the locales 191-194 ("SFO", "LAX", "SJC", and "NYC") are conceptually illustrated as having local configurations 151, 152, 153, and 154, respectively. These local configurations are unlike the logical configuration (i.e., the logical view 101) of the network, which is applicable uniformly to all four physical locales. The local configuration 151 is applicable only to resources within the locale "SFO". The local configuration 152 is applicable only to resources within the locale "LAX". The local configuration 153 is applicable only to resources within the locale "SJC". The local configuration 154 is applicable only to resources within the locale "NYC".

Figure 2:
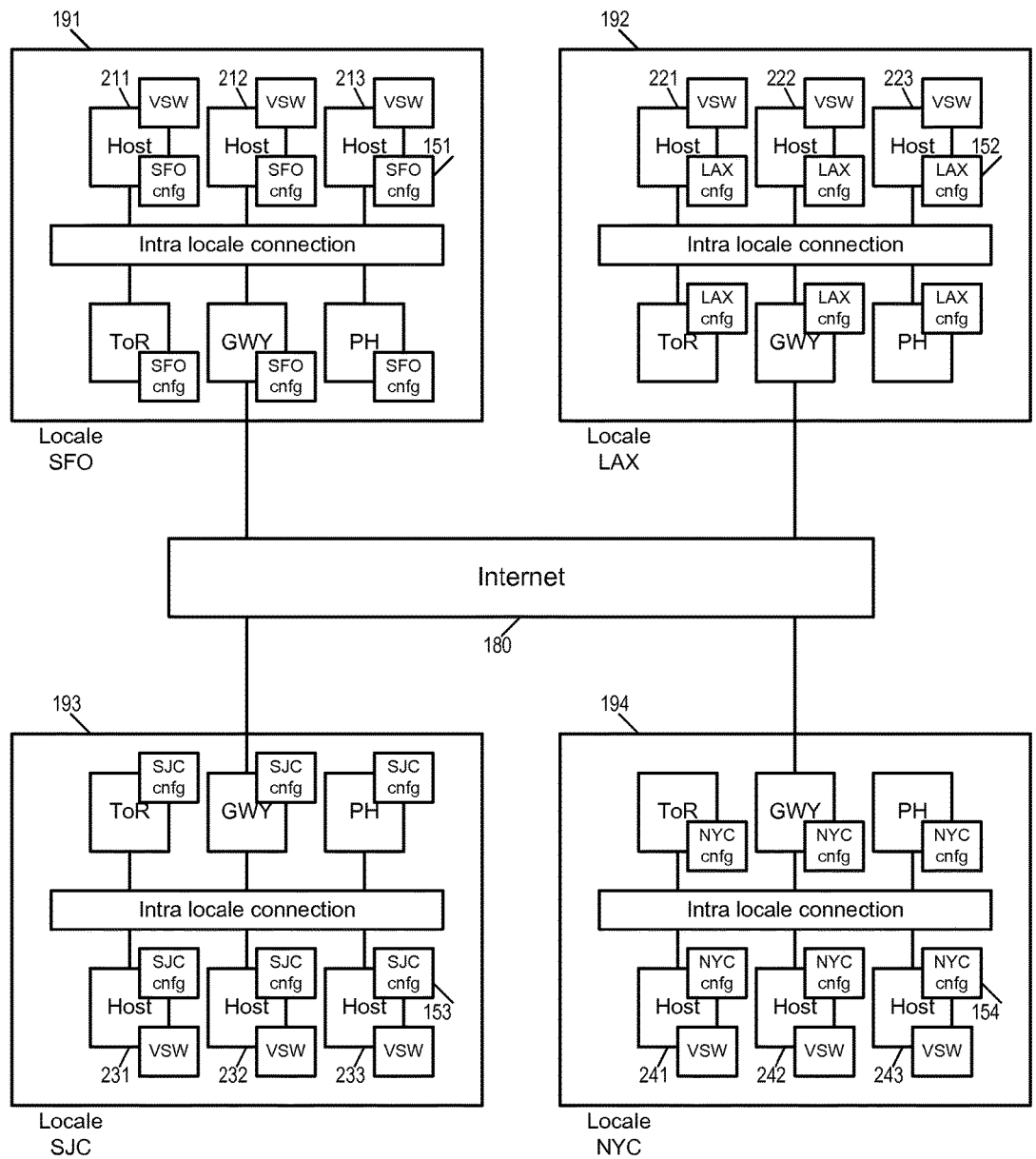
FIG. 2 conceptually illustrates the available networking and computing resources in the physical locales of the network.

FIG. 2 conceptually illustrates the available networking and computing resources in the physical locales 191-194 ("SFO", "LAX", "SJC", "NYC") of the network 100. As illustrated, each physical locale includes a set of computing devices labeled as "host" (hosts 211-213 in the locale 191, hosts 221-223 in the locale 192, hosts 231-233 in the locale 193, and hosts 241-243 in the locale 194). These computing devices are running virtualization software (labeled "VSW") that allows the computing resource to serve as host machines of VMs. The virtualization software running in the host machines are configured according to the logical configuration 105 of the network 100, which allows the host machines to instantiate local copies of the logical switch 121-122 and of the logical router/bridge 131 as physical forwarding elements. Some of the physical locales also include networking devices labeled as "ToR" (Top of Rack) or "PH" (physical routers). These network devices perform packet forwarding tasks (L3/L2 /bridging), but do not operate virtualization software. The host machines, ToRs, and PHs of a physical locale are interconnected by intra-locale connectivity of the physical locale. The computing and routing resources of the physical locale are then connected to the Internet through a gateway device labeled as "GWY".

As mentioned, the computing and network resources of each physical locale are configured according to a set of local configuration in addition to the logical configuration of the network 100. As illustrated, the computing and network resources (host machines, PH's, ToRs, etc) of the physical locales 191-194 are configured by local configurations 151-154, respectively. In some embodiments, the local configurations are used to configure the computing and networking resource of each physical locale according to the local properties of each locale. For example, different locales can have different number of computing devices that serve as host machines. Different locale can have different types of computing devices that serve as host machines. Different locale can have different number or types of ToRs or PHs. The intra-locale connectivity of one locale can have different capacity or latency than the intra-locale connectivity of another locale. And sending packets to a computing or networking resource of a same locale through intra-locale connectivity generally requires less latency than through the Internet to a computing or networking resource of a different locale.

Figure 3:
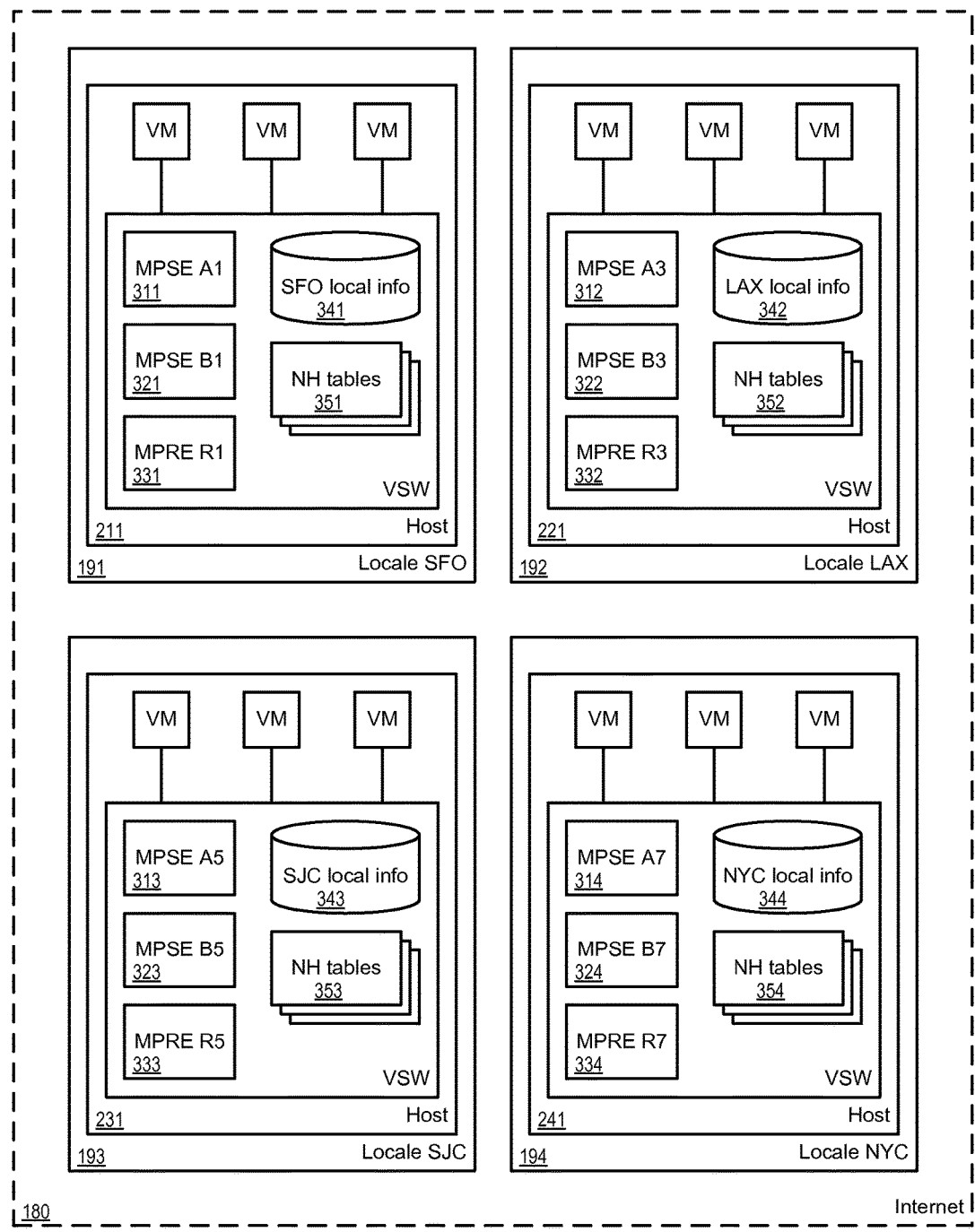
FIG. 3 illustrates the virtualization software running in host machines in the different locales.

FIG. 3 illustrates the virtualization software running in host machines in the different locales. The virtualization software manages the operations of the VMs as well as their access to the computing resources and the network resources of the host machines. In some embodiments, the virtualization software provides an interface between each VM and a logical switch supported by the underlying network. Virtualization software may include one or more software components and/or layers, possibly including one or more of the software components known in the field of virtual machine technology as virtual machine monitors (VMMs), hypervisors, or virtualization kernels. Because virtualization terminology has evolved over time and has not yet become fully standardized, these terms do not always provide clear distinctions between the software layers and components to which they refer. As used herein, the term, "hypervisor" is intended to generically refer to a software layer or component logically interposed between a virtual machine and the host platform. Computing devices that serve as host machines will be further described in Section III below.

FIG. 3 illustrates four host machines 211, 221, 231, and 241 that are in locales 191-194 ("SFO", "LAX", "SJC", and "NYC"), respectively. Each of these host machines is running virtualization software that allows it to be part of the logical configuration 105 of the network 100. The virtualization software allows its host machine to operate local instantiations of the logical switches and logical routers/bridges in the logical configuration. As mentioned, the logical configuration 105 includes the logical switches 121-122 and the logical router/bridge 131. A local instantiation of the logical switch 121 in a host machine is a L2 physical switching element for the network segment A. A local instantiation of the logical switch 122 in a host machine is a L2 physical switching element for the network segment B. A local instantiation of the logical routing/bridging element in a host machine is a physical routing or bridging element. As these physical forwarding elements are managed by the virtualization software, they are also referred to as managed physical switching elements (MPSE) and managed physical routing elements (MPRE). Further descriptions of MPSEs, MPREs, logical routing elements (LREs), and logical switching elements (LSEs) can be found in U.S. patent application Ser. No. 14/137,862 filed on Dec. 20, 2013, now issued as U.S. Pat. No. 9,785,455, titled "Logical Router". U.S. patent application Ser. No. 14/137,862, now issued as U.S. Pat. No. 9,785,455, is herein incorporated by reference.

According to the logical configuration 105 of the network 100, the host machine 211 instantiates MPSEs 311 and 321 as physical forwarding elements A1, B1. The host machine 211 also instantiates an MPRE 331 as the physical forwarding element R1. The physical forwarding elements A3, B3, R3, A5, B5, R5, A7, B7, R7 are likewise implemented by instantiations of MPSEs and MPRE in the host machines 221, 231, and 241. (In some embodiments, MPSEs of different network segments in a same host machine are implemented as one MPSE in that host machine. Such an MPSE distinguishes L2 traffic of different network segment by VNI identifiers in some embodiments).

In addition to the MPSEs and the MPREs, the virtualization software of a host machine also implements local configurations that are specific to the physical locale or to the host machine. In some embodiments, the virtualization software of a host machine of a locale uses information specific to that locale to modify next hop decisions. As illustrated, the host machine 211 has information 341 specific to the locale "SFO", and it uses this locale information to create or modify a set of next hop tables 351. The MPSE 311 and the MPRE 321 in the host machines 211 in turn use the modified next hop tables to select the destination for the packets it produces. Likewise, the MPSEs and the MPREs in the host machines 221, 231, and 241 also uses their respective local configuration or locale information to determine next hop. In other words, the physical locale information (or local configuration) modifies the behaviors of the distributed logical network elements (MPSEs and MPREs) that are specified by the logical configuration.

Several more detailed embodiments of the invention are described below. Section I describes methods for implementing locale-specific configuration for modifying the behavior of distributed logical network elements. Section II describes examples of using locale-specific configurations to modify behaviors of distributed logical network elements. Section III describes an example communications device that implements some embodiments of the invention. Finally, section IV describes an electronic system with which some embodiments of the invention are implemented.

I. Implementing Locale-Specific Configurations

Different embodiments implement local configurations specific to physical locales (or locale-specific configurations) differently. In some embodiment, a local configuration of a physical locale is a version of the logical configuration modified specifically for the physical locale. In some embodiments, such modification is based on locale identifiers that are assigned to the physical locales. In some embodiments, the local configuration is locally provided by the physical locale itself. In some embodiments, the local configuration is provided by a centralized network controller or manager, which delivers local configurations to each of the physical locales. In some embodiments, local configurations are embedded in the logical configuration of the entire network, and it is up to a physical locale to identify portions of the logical configuration as being applicable to that physical locale. The networking and computing resources of the locale (e.g., virtualization software in host machines) in turn uses the assigned locale identifier to identify applicable local configuration embedded in the logical configuration.

An example portion of a logical configuration is a definition of a route entry for a logical router (e.g., the logical router 131), which in some embodiments is a directive/command/definition/statement that looks like:

$$<\text{destination-network/prefix}> \text{ via nexthop } <\text{nh}> \text{ forward on interface } <\text{id}> \quad (1)$$

Thus, a logical configuration statement "0/0 via nexthop 192.168.1.1 forward on interface lif0" would be globally applicable to all physical locales. However, this definition does not account for any modifier based on physical locales. A route entry having a locale based modifier looks like:

$$<\text{destination-network/prefix}> \text{ via nexthop } <\text{nh}> \text{ on locale } <\text{locale-id}> \text{ forward on interface } <\text{id}> \quad (2)$$

Such a route entry is a directive that allows locale-specific property to be taken into consideration. Thus, a route entry "0/0 via nexthop 192.168.1.1 on locale 'NYC' forward on interface lif0" is a route entry having locale modifier "NYC". It is a local configuration that would be recognized as a local configuration specific to locale "NYC" while being ignored by other locales based on the locale ID "NYC". Likewise a route entry "0/0 via nexthop 192.168.1.2 on locale 'LAX' forward on interface lif0" is a route entry having local modifier "LAX". It would be recognized as a local configuration specific to locale "LAX" while being ignored by other locales based on the locale ID "LAX".

Figure 4:
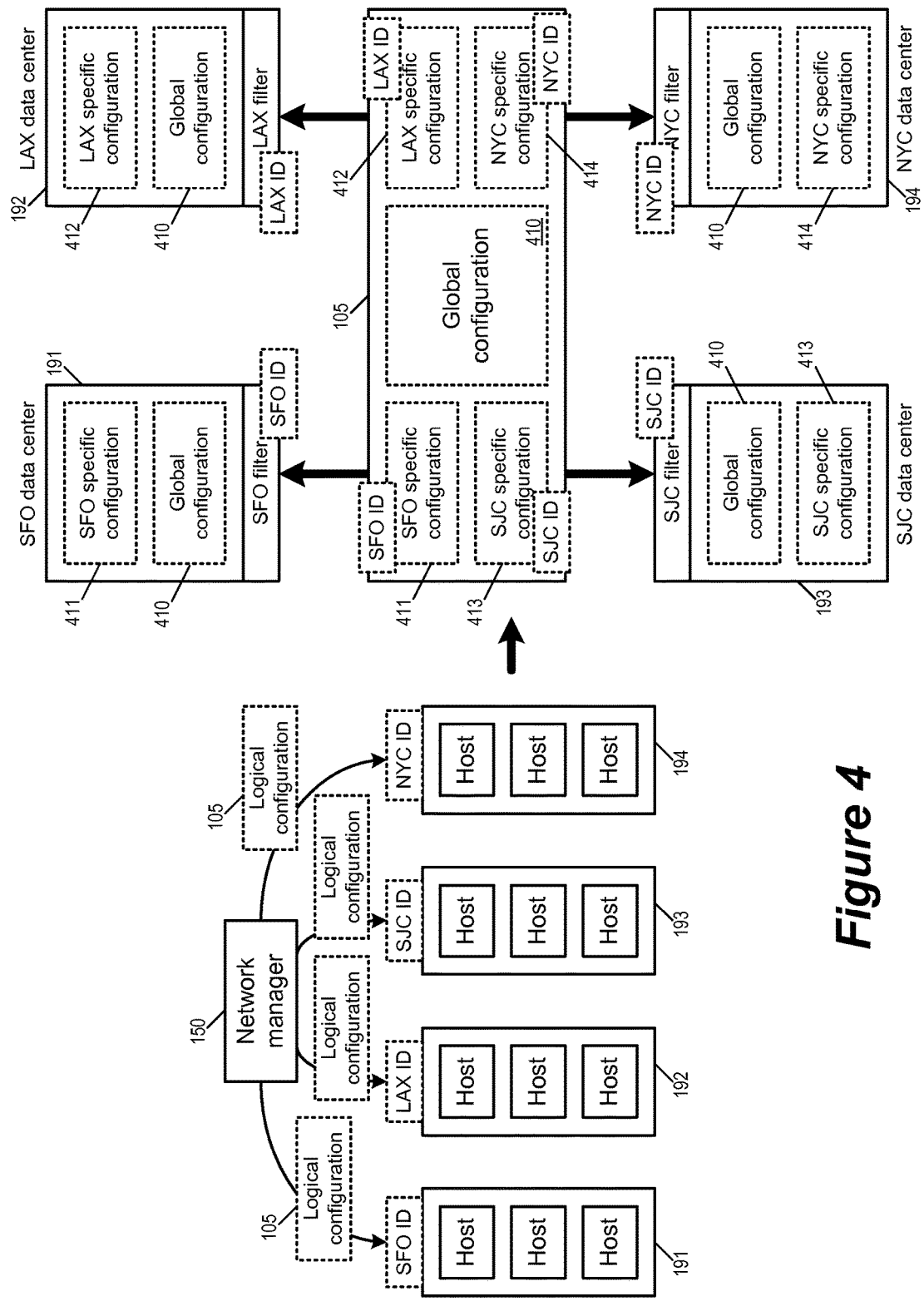
FIG. 4 illustrates using assigned locale identifier to identify applicable portions of the logical configuration.

FIG. 4 illustrates using assigned locale identifier to identify applicable portions of the logical configuration. The figure illustrates the logical configuration 105 for the network 100 that includes portions applicable to all physical locales as well as portions that are locale specific. As illustrated, the logical configuration 105 includes a globally applicable portion 410 that is applicable to all locales. The logical configuration 105 also includes portions 411-414 that are specific to locales 191-194 ("SFO", "LAX", "SJC", and "NYC"), respectively. In some embodiments, such locale-specific portions of the logical configuration include directives having locale specific modifiers such as route entry (2) described above.

In order for each physical location to identify portions of the logical configuration 105 that are applicable to them, a network manager 150 first assigns locale identifiers to the physical locales. In some embodiment, each physical locale receives its locale identifier during an initial configuration phase of the network 100. The physical locale then uses the receive locale ID to identify and apply applicable portions of the logical configuration while ignoring portions of the logical configuration that is applicable only to other physical locales. In other words, each physical locale uses the physical locale identifier as a filter to accept and apply only relevant portions of the logical configuration. For example, the locale "SFO" (191) uses its assigned locale identifier to accept only the global configuration 410 and the portion 411 that is specific to the locale "SFO". In some embodiments, portions of the logical configuration that are specific to a physical locale are marked by the identifier of that physical locale, so each physical locale identifies the relevant portion of the logical configuration by comparing its own received physical locale ID with the locale IDs that marks the different portions of the logical configuration. A process for identifying locale-specific portions of logical configuration as local configuration is described by reference to FIG. 6a below.

FIG. 4 also conceptually illustrates a filter for each of the physical locales (locale filters 421-424 for locales 191-194, respectively), which uses the locale ID of its physical locale to filter-in relevant portions of the logical configuration for its locale. In some embodiments, the filtering of the logical configuration for a physical locale is performed by the networking and computing resources within the locale (such as by virtualization software of the host machines). In some embodiments, the filtering of the logical configuration is performed by a local configuration manager in each of the locales.

Figure 5:
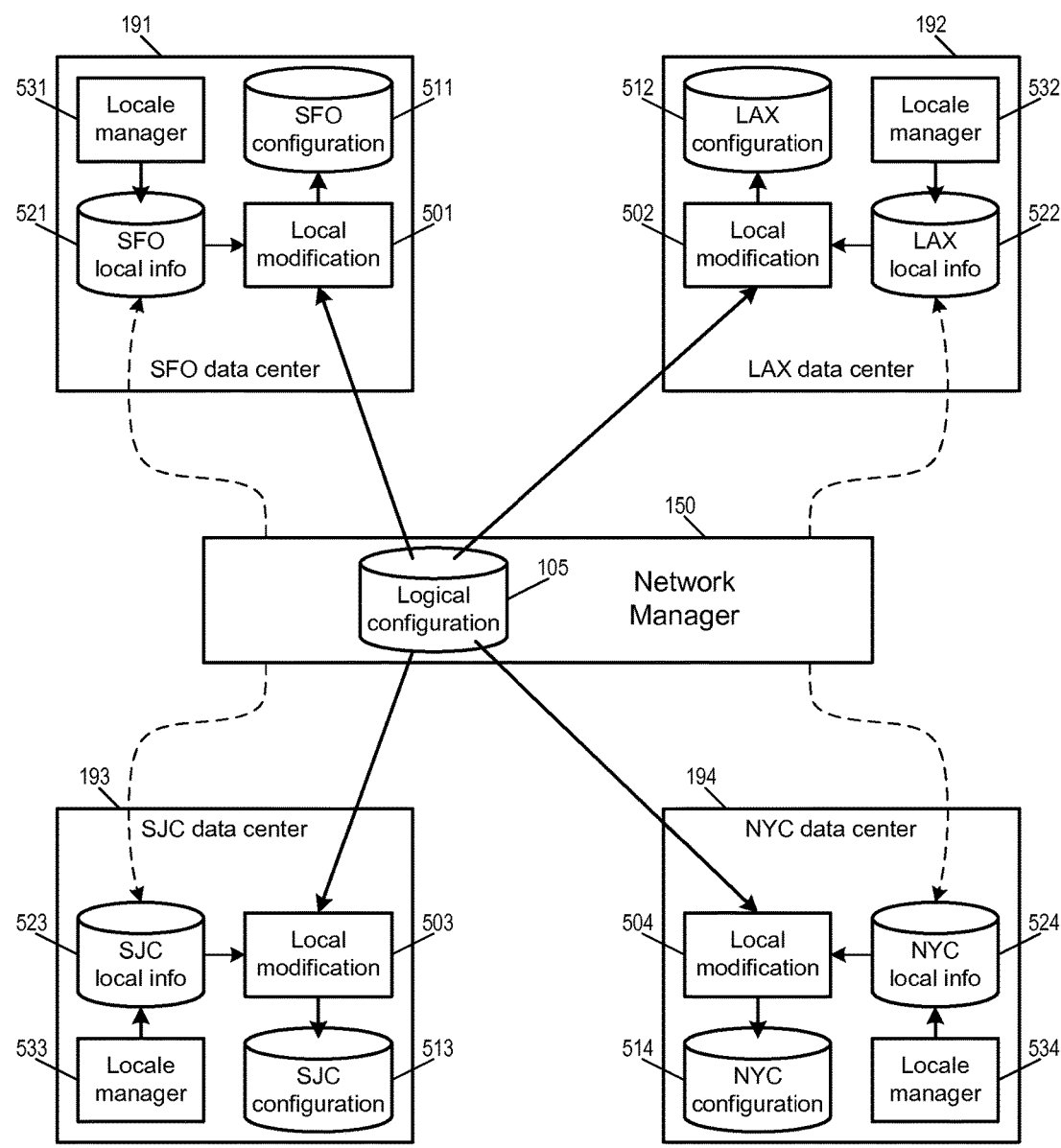
FIG. 5 conceptually illustrates the modification of logical configuration into locale-specific configuration at the physical locales.

As mentioned, in some embodiment, a local configuration of a physical locale is a version of the logical configuration that is modified specifically for the physical locale. In some of these embodiments, at least some of the modification is performed at the physical locales themselves based on their locale-specific properties. FIG. 5 conceptually illustrates the modification of logical configuration into locale-specific configuration at the physical locales. As illustrated, the network manager 150 delivers the logical configuration 105 to each of the physical locales 191-194. Each of the physical locales then performs local modification on the received logical configuration based on information or properties specific to that locale to produce a set of local configuration specific to that locale. For example, the locale "SFO" (191) modifies logical configuration 105 into a SFO specific local configuration 511 based on SFO specific information 521. The modification is performed by a local modification module 501, which in some embodiments is part of the virtualization software operating in host machines of the physical locale 191.

The locale specific information (e.g., the "SFO" local information 521) in some embodiments includes portions of the logical configuration that is relevant to the locale provided by the network manager 150, such as the locale specific portions 411-414 of the logical configuration or the locale specific route entry for a logical router as described above. The locale specific information in some embodiments includes static network topology of the physical locale (e.g., a data center), which is provided by a central network manager in some embodiments in which the network manager has such information. In some embodiments, the locale specific information is furnished locally by a local network manager (e.g., the local manager 531 of the physical locale "SFO" 191). In some embodiments, the locally furnished information includes static network topology of the physical locale. In some embodiments, the locally furnished information includes dynamic network metrics of the physical locale that are updated in real time (such as latency, available memory, available bandwidth, etc.) A process for modifying logical configuration based on locale-specific information is described by reference to FIG. 6b below.

Figure 6B:
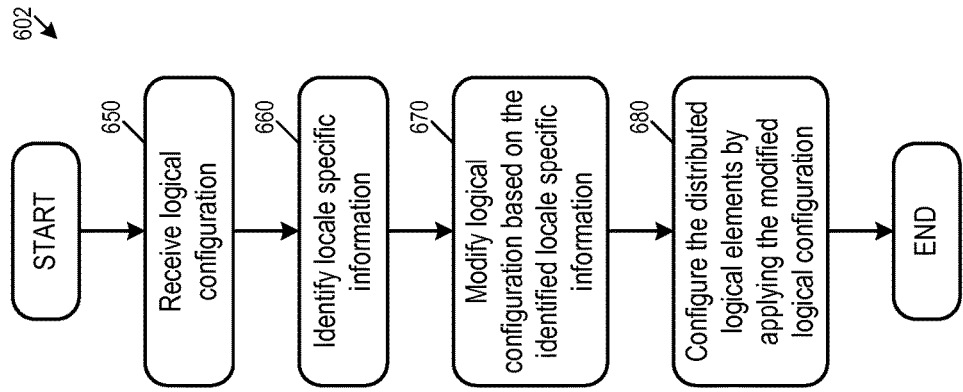
FIGS. 6a-b conceptually illustrate processes for using physical location information to modify the behaviors of distributed logical network elements in logical configurations.
Figure 6A:
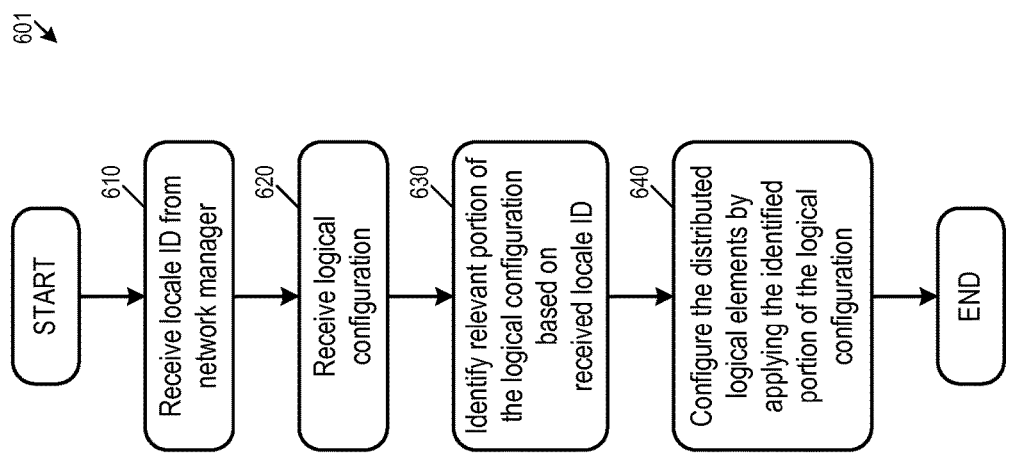

For some embodiments, FIGS. 6a-b conceptually illustrate processes for using physical location information to modify the behaviors of distributed logical network elements in logical configurations. FIG. 6a conceptually illustrates a process 601 for using physical locale identifier to identify locale-specific portions of the logical configuration (or configuration definitions having a specific locale modifier). FIG. 6b conceptually illustrates a process 602 for modifying logical configuration based on locale specific information. In some embodiments, the processes 601 and 602 are performed by the virtualization software of a host machine in a physical locale.

Some embodiments perform the process 601 during initial configuration of a network according to a logical configuration. For example, the host machines (i.e., their virtualization software) in the physical locales 191-194 perform the process 601 when the network manager 150 is configuring the underlying physical hardware according to the logical configuration 105.

The process 601 starts when it receives (at 610) a locale identifier from the network manager. The locale identifier is the identifier that the network manager assigns to the physical locale that includes host machine running the process. The process then receives (at 620) logical configuration from the network manager. In some embodiments, the process receives the locale identifier and the logical configuration through control plane communications with the network manager.

Next, the process identifies (at 630) applicable portions of the logical configuration based on the received locale ID that is assigned to the physical locale of the host machine. In some embodiments, the process filters the logical configuration to accept only relevant portions of the logical configuration, i.e., the portions that are either globally applicable to all physical locations or the portions that are marked by the matching locale ID. In some embodiments, the relevant portions of the logical configuration are configuration definitions/statements/directives that are modified by a locale ID (e.g., the locale-ID-modified route entry (2)).

Finally, the process configures (at 640) the distributed logical network elements (e.g., MPSE and MPRE) by applying the portions of the logical configuration identified as relevant to this physical locale. In some embodiments, the globally applicable portions of the logical configuration instantiates the distributed logical network elements, while the locale-specific portions of the logical configuration modifies the behavior of the instantiated distributed logical network elements. The process 601 then ends.

The process 601 is a process for configuring a physical locale based on information provided by a network manager during an initial configuration of the network. The process 602 is on the other hand a process for modifying a received logical configuration. Some embodiments performs the process 602 after the initial configuration by modifying the received logical configuration based on locale specific information, which in some embodiments includes network topology from the perspective of the physical locale and/or static/dynamic network performance metrics that are provided by the physical locale. Some embodiments perform the process 602 during or soon after the initial configuration.

The process 602 receives (at 650) the logical configuration from network manager during initial configuration. The process 602 then identifies (at 660) the locale specific information. In some embodiments, the process 602 identifies the locale specific information within the configuration data transmitted by the central network manager. In some embodiments, the process 602 identifies the locale specific information from information that are available locally at the physical locale, such as dynamic real-time performance matrix of the locale or the network topology of the locale.

The process then modifies (at 670) the logical configuration based on the identified locale specific information. The process then configures (at 680) the distributed logical network elements in the logical configuration by applying the modified logical configuration. For example, in some embodiments, the process modifies the logical configuration by modifying next hop preferences of a MPSE or MPRE based on identified locale information (hence modifying the MPSE/MPRE's behavior). The locale-specific information in some embodiments includes information on networking resources in the locale that allows a distributed logical network element to select or avoid a particular node as next hop. After applying the modified logical configuration, the process 602 ends.

II. Use Cases of Locale-Specific Configurations

Different embodiments use locale-specific information differently to modify the behavior of distributed logical network elements. For example, as mentioned, some embodiments use locale-specific information to modify next-hop preferences. Specifically, some embodiments perform ECMP to select the next hop from VMs, MPSE, and/or MPREs. The locale-specific information or modified logical configuration allows the next-hop selection for these globally configured distributed logical network elements to operate based on local information that are hidden from the central operator of the network.

Figure 7:
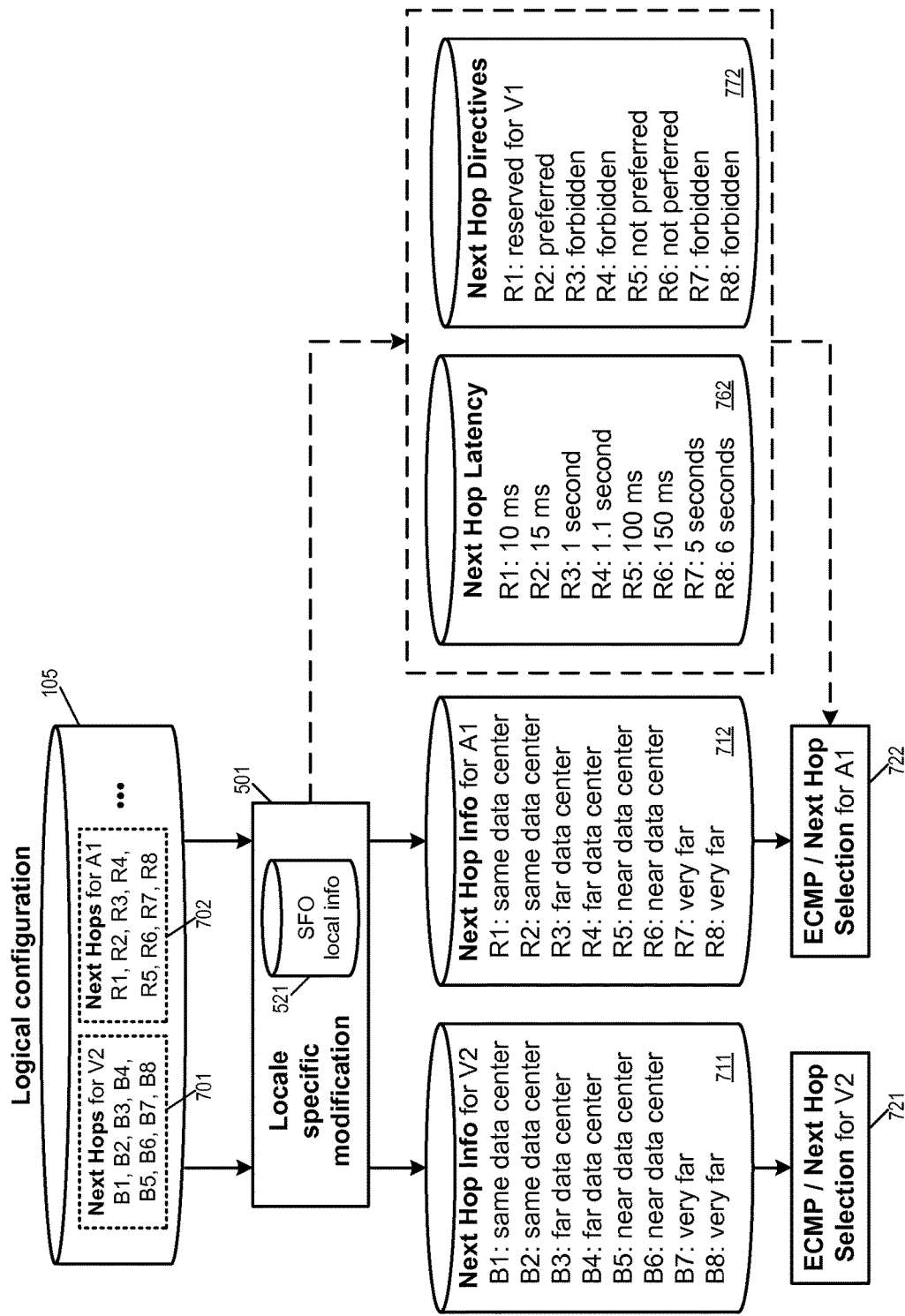
FIG. 7 conceptually illustrates using locale specific modification when performing ECMP for deciding the next hop of a distributed logical network elements.

For some embodiments, FIG. 7 conceptually illustrates using locale specific modification when performing ECMP for deciding the next hop of a distributed logical network elements. The figure illustrates the modification of the logical configuration for the VM 112 (V2) and the MPSE 311 (A1) based on locale-specific information of the locale 191 "SFO" (since both V2 and A1 are instantiated in host machines of the locale 191).

As illustrated, the logical configuration 105 of the network 100 includes, among others, next hop table 701 for the VM 112 (V2) and next hop table 702 for the MPSE 311 (A1). The VM 112 belongs to network segment B, and hence all MPSEs of the logical switch B 122 (B1-B8) are eligible as next hop for the VM 112. The MPSE 311 (A1) is an instantiation of the logical switch element 121 for the network segment A (logical switch A). Since the logical router 131 is a next hop of the logical switch A, all of the MPREs belonging to the logical router 131 (R1-R8) are eligible as next hop for MPSE 311. However, these eligible hops are determined strictly from the logical configuration point of view without considering any locale-specific information.

The content of the logical configuration 111 is processed by the locale specific modification module 501 of the locale "SFO". The module 501 uses information specific to the locale "SFO" (local information 521) to modify the logical configuration 105 for the distributed logical network elements (MPSEs and MPREs) running in the host machines of the physical locale "SFO". In some embodiments (not illustrated), the locale specific modification is based on relevant portions of the logical configuration that are identified by a locale ID assigned by the network manager. The locale specific modification 501 produces a locale-modified configuration 711 for the VM 112 (V2) and a locale-modified configuration 712 for the MPSE 311 (A1)

The locale-modified configurations distinguish between the possible different next hops of a distributed logical network element. Specifically, the modified configuration 711 distinguishes between possible next hops B1-B8 based on their separation from the VM 112 (V2), while the modified configuration 712 distinguishes between the possible next hops R1-R8 based on their separation from the MPSE 311 (A1). Such distinctions are made possible by the locale specific information 521, which identifies next hops in this physical locale/data center versus next hops in other physical locales/data center. For example, the modified configuration 711 identifies B1 and B2 as next hops in the same data center as V2 (also in locale "SFO"), B5 and B6 as next hops in a near data center (in locale "SJC"), B3, B4, B7, and B8 as next hops that are either far or very far (local "LAX" or "NYC"). Based on the information, a ECMP module 721 for the VM 112 will be able to next hop selection decisions that are optimized based on the locale specific information (e.g., by favoring or weighing toward next hops that are near or in the same data center). The ECMP module 722 likewise makes next hop decisions based on locale information that distinguishes between R1-R8 as next hops (R1 and R2 being in the same data center as A1, R5 and R6 being in a near data center, R3, R4, R7, R8 being in far data center).

The modified configuration 712 is an example local configuration that uses locale-specific parameters (i.e., geographic separation from the current locale) to characterize the possible next hops. FIG. 7 also illustrates other example modified configurations (762 and 772) that use other locale-specific parameters to characterize the possible next hops.

The modified configuration 762 reports the latencies to/from the possible next hops R1-R8 of the MPSE 311 (A1). The ECMP module 722 can then use the reported latencies to select the next hop. As illustrated, next hops R1 and R2 has the smallest latencies (possibly because they are in the same locale "SFO"), while next hops R7 and R8 has the largest latencies (possibly because they are in a distant locale "NYC"). In some embodiments, the latency metrics reported in the modified configuration 762 are based on real-time measurements obtained by the physical hardware of the locale. In some embodiments, the latency metrics reported are historical averages that can be supplied locally by data center or centrally by the central network manager (e.g., 150).

The modified configuration 772 specifies directives or commands that are associated with each of the possible next hops. As illustrated, R3, R4, R7, and R8 are specified as "forbidden" for traffic from MPSE A1, while R2 is specified as "preferred". R1 has a directive that says "reserved for V1" such that only traffic originated from the VM 111 (V1) may use R1 as next hop. Directives such as these are used by some embodiments to guarantee bandwidth for a particular VM by e.g., reserving a networking resource for traffic from the particular VM. Such directives can be specified locally by the data center or centrally by the network manager (e.g., 150) in some embodiments.

In some embodiments, modified configurations of different types are used jointly by ECMP modules when selecting a next hop. For example, the ECMP module 722 can use the information from any or all of the modified configurations 712, 762, and 772 when selecting a next hop. Though not illustrated, other locale-specific parameters can also be used to characterize next hops (e.g., storage capacity of computing device, processor speed, etc.). More generally, different locale-specific parameters can be used to modify the behaviors of distributed logical network elements or to modify uniform/global logical configurations that are centrally specified by a network manager.

In some embodiments, locally modified configurations are used to determine the placement of VMs. As mentioned, a logical network may span multiple data centers in different geographical locations. In some embodiments, the operator or the user of the logical network does not specify or care which host machine in which data center is hosting the VM, but a VM placement engine uses locale specific information to decide the placement of VMs, (i.e., to select a suitable host machine in a suitable physical locale hosting the VM based on the locale-specific information of all the physical locales).

Figure 8:
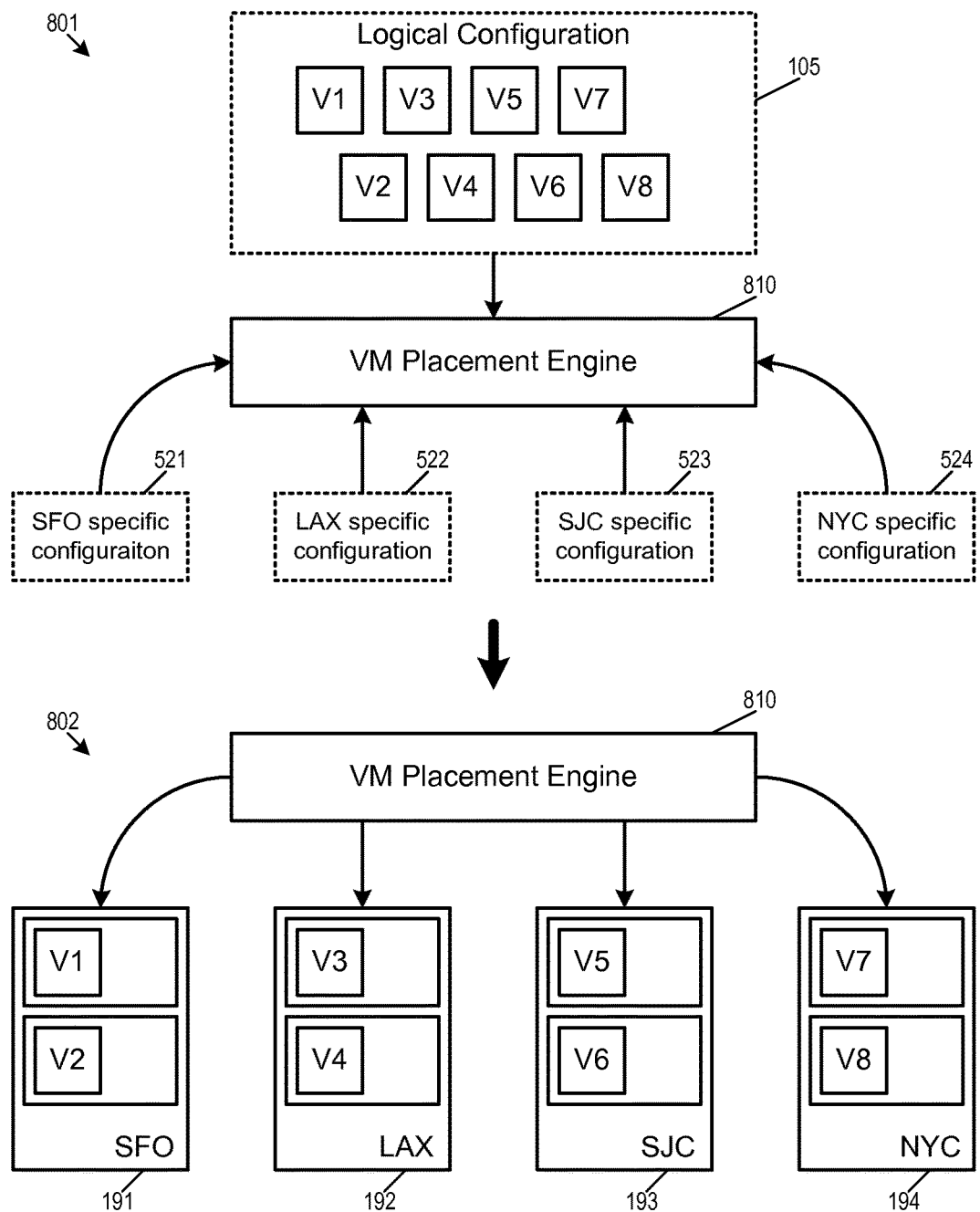
FIG. 8 illustrates a VM placement engine that uses locale-specific information to decide the placement of VMs in a network.

For some embodiments, FIG. 8 illustrates a VM placement engine 810 that uses locale-specific information to decide the placement of VMs in a network. The figure illustrates the locale-specific information based VM placement in two stages 801-802.

At the first stage 801, the VM placement engine 810 receives locale-specific information 521-524 for the locales 191-194 ("SFO", "LAX", "SJC", and "NYC"). In some embodiments, such information are generated and provided by the physical locales (data centers) themselves. In some embodiments such information are maintained and provided centrally by the network manager (e.g., 150). The VM placement engine 810 also receives a list of VMs that needs to be placed from the logical configuration 105 of the network 100.

At the second stage 802, the VM placement engine 810 assigns the VMs specified by the logical configuration to host machines in the different physical locales. The VM placement engine examines the locale specific information when selecting a locale and a host machine for a VM. In some embodiments, some or all of the VMs in the logical configuration are each associated with a unique set of requirements, and the placement engine in turn finds the most suitable host machine and physical locale for those VMs based on the VM's requirements and the locale's specific properties. For example, a particular VM may require certain bandwidth guarantee, and the VM placement engine would in turn use the locale-specific information to identify a physical locale and a host machine that can provide the requisite bandwidth. Such locale-specific information may in some embodiments include an identification of a particular distributed logical network element (MPSE or MPRE) running on a particular host machine that has sufficient bandwidth to handle the guaranteed bandwidth requirement.

Though not illustrated, in some embodiments, the VM placement engine sends directives to each of the locales after the placements of the VMs are decided. In some embodiments, such directives are also locale-specific, such as to reserve a particular networking or computing resource in the locale for a particular VM, or to require a particular next hop for a particular distributed logical network element, etc. In some embodiments, the delivery of such directives or command relies on locale IDs that were assigned to the locales by the network manager as described by reference to FIG. 4 above.

III. Computing Device

Figure 9:
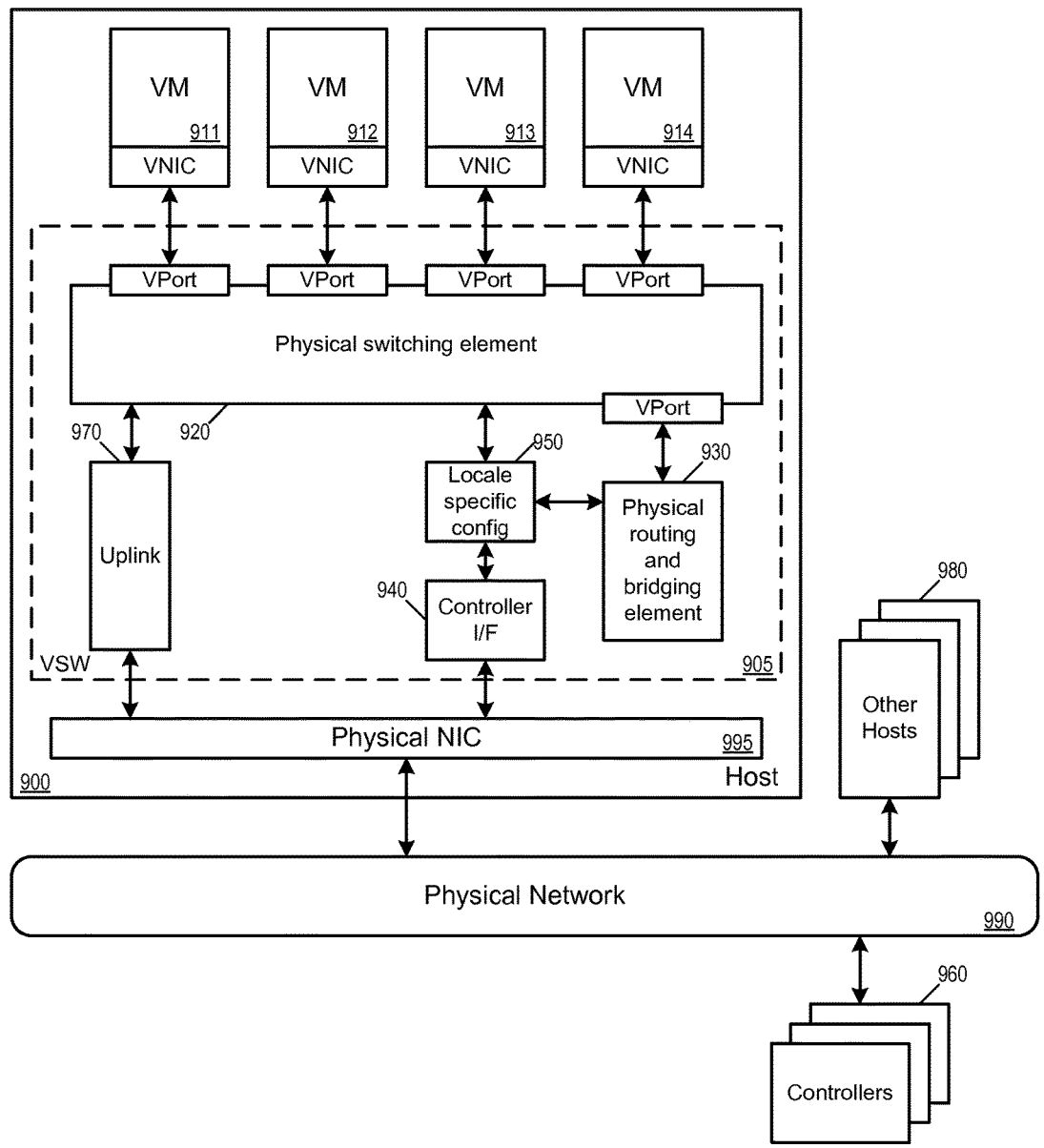
FIG. 9 illustrates an example host machine that is operating virtualization software.

As mentioned earlier, some embodiments of the invention are implemented by virtualization software or hypervisors running on computing devices serving as host machines. For some embodiments, FIG. 9 illustrates an example host machine 900 that is operating virtualization software 905. The virtualization software 905 allows the host machine to host virtual machines 911-914 as well as connecting the virtual machines to a physical network 990. This physical network 990 may span one or more data centers and include various physical switches and routers.

As illustrated, the host machine 900 has access to the physical network 990 through a physical NIC (PNIC) 995. The virtualization software 905 serves as the interface between the hosted VMs 911-914 and the physical NIC 995 (as well as other physical resources, such as processors and memory). Each of the VMs includes a virtual NIC (VNIC) for accessing the network through the virtualization software 905. Each VNIC in a VM is responsible for exchanging packets between the VM and the virtualization software 905. In some embodiments, the VNICs are software abstractions of physical NICs implemented by virtual NIC emulators.

The virtualization software 905 manages the operations of the VMs 911-914, and includes several components for managing the access of the VMs to the physical network (by implementing the logical networks to which the VMs connect, in some embodiments). As illustrated, the virtualization software 905 includes a physical switching element 920, a physical routing element 930, a controller interface 940, an uplink module 970, and a locale-specific configuration module 950.

The controller interface 940 receives control plane messages from a controller or a cluster of controllers 960. In some embodiments, these control plane message includes configuration data for configuring the various components of the virtualization software and/or the virtual machines (such as the physical switching element 920 and the physical routing element 930). In some embodiments, the control plane messages also include locale-specific configuration information from a central network manager or a local network manager.

The physical switching element 920 (or managed physical switching element, MPSE) delivers network data to and from the physical NIC 995, which interfaces the physical network 990. The physical switching element also includes a number of virtual ports (vPorts) that communicatively interconnects the physical NIC with the VMs 911-914, the physical routing element 930 and the controller interface 940. Each virtual port is associated with a unique L2 MAC address, in some embodiments. The physical switching element performs L2 link layer packet forwarding between any two network elements that are connected to its virtual ports. The physical switching element also performs L2 link layer packet forwarding between any network element connected to any one of its virtual ports and a reachable L2 network element on the physical network 990 (e.g., another VM running on another host).

The physical routing element 930 (or managed physical routing element, MPRE) performs L3 routing (e.g., by performing L3 IP address to L2 MAC address resolution) on data packets received from a virtual port on the physical switching element 920. In some embodiments, the virtual port that the physical routing element 930 is attached to is a sink port.

Each routed data packet is then sent back to the physical switching element 920 to be forwarded to its destination according to the resolved L2 MAC address. This destination can be another VM connected to a virtual port on the physical switching element 920, or a reachable L2 network element on the physical network 990 (e.g., another VM running on another host, a physical non-virtualized machine, etc.).

The locale specific configuration module 950 stores information specific to the physical locale of the host machine. The information is made available to the physical switching element 920 and the physical routing and bridging element 930, which uses the locale specific information to modify their behavior by e.g., favoring or disfavoring specific next hops. In some embodiments, the locale specific configuration module uses a locale identifier to determine if data received from controller interface 940 is a locale-specific configuration data that is applicable to this host machine. The locale specific configuration module 950 in some of these embodiments act as a filter and allow only relevant configuration data to be used to modify the behavior of the physical switching element 920 and the physical routing element 930.

The uplink module 970 relays data between the physical switching element 920 and the physical NIC 995. In some embodiments, the uplink module 970 allows the host machine 900 to serve as a tunnel endpoint for encapsulation overlay networks such as VXLAN and VLANs. VXLAN is an overlay network encapsulation protocol. An overlay network created by VXLAN encapsulation is sometimes referred to as a VXLAN network, or simply VXLAN. When a VM on the host 900 sends a data packet (e.g., an ethernet frame) to another VM in the same VXLAN network but on a different host, the uplink module 970 encapsulates the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The uplink module 970 also decapsulates incoming VXLAN packets and forwards only the original inner data packet to the destination VM.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
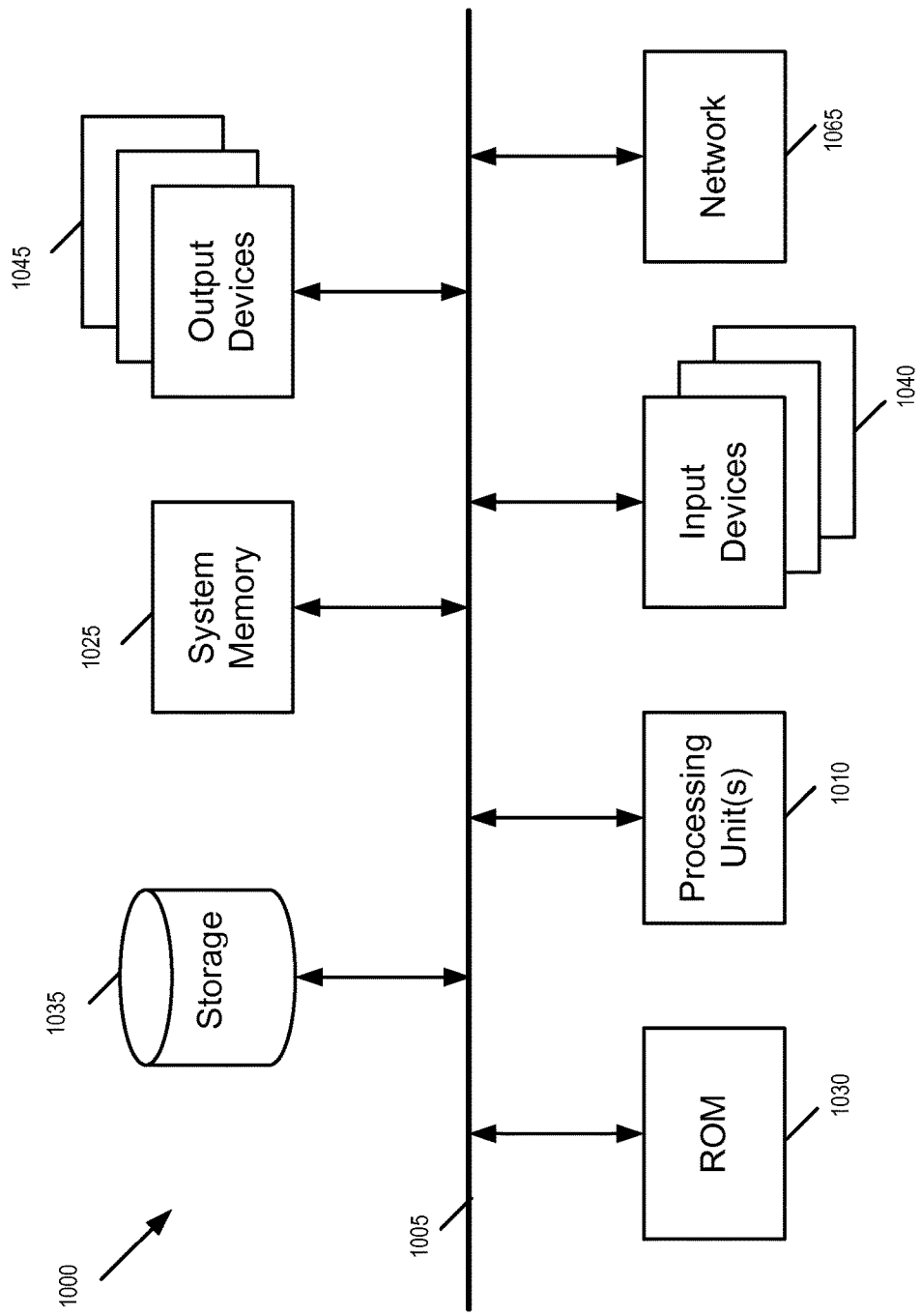
FIG. 10 conceptually illustrates an electronic system with which some embodiments of the invention are implemented.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieves instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 6*a-b*) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. For a logical forwarding element (LFE) spanning a plurality of physical locales and implemented by a plurality of managed forwarding elements (MFEs) at the plurality of physical locales, a method of configuring a set of MFEs at a particular locale that implement the LFE along with MFEs of at least one other physical locale, the method comprising:
   receiving a set of configuration data to define forwarding behaviors for the MFEs that implement the LFE that spans the plurality of physical locales;
   using a locale identifier assigned to the particular physical locale to perform a filter operation that eliminates, from the received configuration data set, configuration data that is not applicable to the particular locale, in order to produce a modified configuration data set; and
   using the modified configuration data set to configure the set of MFEs at the particular locale that implement the LFE that spans the plurality of physical locales, the modified configuration data set configuring the set of MFEs at the particular locale to have a set of forwarding behaviors that are custom specified for the particular locale and not implemented by the MFEs of at least one other locale.

2. The method of claim 1, wherein the plurality of MFEs comprise managed software switches, and the LFE comprises a logical switch that spans a plurality of managed software switches at the plurality of physical locales.

3. The method of claim 2, wherein the plurality of MFEs further comprise managed software routers, and the LFE further comprises a logical router that spans a plurality of managed software routers at the plurality of physical locales.

4. The method of claim 1 further comprising receiving the locale identifier from a network manager during an initial configuration.

5. The method of claim 1, wherein the custom specified set of forwarding behaviors for the particular locale comprises using a set of locale-specific parameters to determine a custom set of next hop determinations for the particular locale.

6. The method of claim 1, wherein the custom specified set of forwarding behaviors for the particular locale comprises using a set of locale-specific parameters to determine a custom set of ECMP (equal cost multi path) routing behaviors for the particular locale.

7. The method of claim 1, wherein each MFE executes on a different host computer operating at one of a plurality of physical locales.

8. The method of claim 1 further comprising receiving with the set of configuration data a set of route entries that specify the locale identifier of the particular physical locale.

9. A computing device situated in a particular physical locale, the computing device comprising:
a set of one or more processing units;
a non-transitory machine readable medium storing sets of instructions for execution by the set of processing units, the sets of instructions for:
executing a plurality of virtual machines (VMs) and a particular managed forwarding element (MFE) for forwarding data packets to and from at least a set of the VMs, wherein the MFE implements a logical forwarding element (LFE) spanning a plurality of physical locales, with a plurality of MFEs located at the particular locale and at least one other locale, wherein a set of configuration data defines forwarding behaviors of particular MFE and the plurality of MFEs to implement the LFE that spans the physical locales;
using a locale identifier assigned to the particular physical locale to perform a filter operation that eliminates, from the configuration data set, configuration data that is not applicable to the particular locale, in order to produce a modified configuration data set; and
using the modified configuration data set to configure the particular MFE operating on the computing device at the particular physical locale to have a set of forwarding behaviors that are custom specified for the particular locale and not implemented by the MFEs of the other locale.

10. The computing device of claim 9, wherein the plurality of MFEs comprise managed software switches, and the LFE comprises a logical switch that spans a plurality of managed software switches at the plurality of physical locales.

11. The computing device of claim 10, wherein the plurality of MFEs further comprise managed software routers, and the LFE further comprises a logical router that spans a plurality of managed software routers at the plurality of physical locales.

12. The computing device of claim 9, wherein the custom specified set of forwarding behaviors for the particular locale comprises using a set of locale-specific parameters to determine a custom set of next hop determinations for the particular locale.

13. The computing device of claim 9, wherein the custom specified set of forwarding behaviors for the particular locale comprises using a set of locale-specific parameters to determine a custom set of ECMP (equal cost multi path) routing behaviors for the particular locale.

14. The computing device of claim 9, wherein the modified configuration data set comprises a set of route entries that specify the locale identifier of the particular physical locale.

15. The computing device of claim 9, wherein the modified configuration data set comprises a set of directives for the particular locale to reserve a network resource in the locale for a particular VM executing on the computing device.

16. A non-transitory machine readable medium storing a program for execution by at least one processing unit of a particular host computer at a particular physical locale, the program for defining a logical forwarding element (LFE) that spans a plurality of physical locales and is implemented by a plurality of managed forwarding elements (MFEs) at the plurality of physical locales, the program comprising sets of instructions for:
receiving a set of configuration data to define forwarding behaviors for MFEs that implement the LFE that spans the plurality of physical locales, the plurality of MFEs comprising a particular MFE executing on the particular host computer implementing the LFE;
using a locale identifier assigned to the particular physical locale to perform a filter operation that eliminates, from the received configuration data set, configuration data that is not applicable to the particular locale, in order to produce a modified configuration data set; and
using the modified configuration data set to configure the particular MFE to select a different next hop than another MFE at a different physical locale for a similar data packet.

17. The non-transitory machine readable medium of claim 16, wherein the modified configuration data set further configures the particular MFE with a set of locale-specific parameters to determine a custom set of ECMP (equal cost multi path) routing behaviors for the particular locale.

18. The non-transitory machine readable medium of claim 16, wherein the plurality of MFEs comprise managed software switches, and the LFE comprises a logical switch that spans a plurality of managed software switches at the plurality of physical locales.

19. The non-transitory machine readable medium of claim 18, wherein the plurality of MFEs further comprise managed software routers, and the LFE further comprises a logical router that spans a plurality of managed software routers at the plurality of physical locales.

20. The non-transitory machine readable medium of claim 16, wherein the set of configuration data comprises a set of route entries that specify the locale identifier of the particular physical locale.

21. The non-transitory machine readable medium of claim 16, wherein the modified configuration data set comprises a set of directives for the particular locale to reserve a network resource in the locale for a particular VM executing alongside the particular MFE on the particular host computer.

22. The method of claim 7, wherein the modified configuration data set comprises a plurality of directives for each physical locale to reserve sets of network resources in each locale for VMs executing alongside the MFEs on the different host computers.

* * * * *